428-919 SR
4/8/86 XR 4,581,284

United States Patent [19]
Eggert et al.
[11] Patent Number: 4,581,284
[45] Date of Patent: Apr. 8, 1986

[54] FIBER COMPOUND MATERIAL

[75] Inventors: Klaus Eggert; Manfred Flemming, both of Markdorf; Siegfried Roth, Salem; Horst Schneider, Meersburg, all of Fed. Rep. of Germany

[73] Assignee: Dornier GmbH, Friedrichshafen, Fed. Rep. of Germany

[21] Appl. No.: 584,442

[22] Filed: Feb. 28, 1984

[30] Foreign Application Priority Data

Mar. 1, 1983 [DE] Fed. Rep. of Germany ....... 3307066

[51] Int. Cl.[4] ................................................ B32B 5/16

[52] U.S. Cl. .................................... 428/283; 428/240; 428/246; 428/284; 428/323; 428/328; 428/402; 428/902; 428/919; 428/251; 428/285; 428/244

[58] Field of Search ............... 428/240, 241, 242, 244, 428/246, 251, 252, 283, 284, 286, 323, 328, 402, 919, 922, 902

[56] References Cited

U.S. PATENT DOCUMENTS 4,186,648 2/1980 Clausen et al. ..................... 428/240
4,435,465 3/1984 Ebneth et al. ....................... 428/240
4,507,354 3/1985 Ishikawa ............................ 428/902

*Primary Examiner*—James J. Bell
*Attorney, Agent, or Firm*—Ralf H. Siegemund

[57] ABSTRACT

A fiber compound material of individual layers of superposed fiber plies such as glass fiber prepregs which are joined together by a matrix of a resin and a hardener and act as a load carrying structure to absorb electromagnetic waves. Radar beam-absorbing fillers, for instance iron powder or soot, are included, in concentrations varying from the outside to the inside, in the individual plies of the fiber compound material.

12 Claims, 2 Drawing Figures

FIBER COMPOUND MATERIAL

This invention relates to a fiber compound material composed of individual plies of superposed directed fiber plies, for instance glass fiber prepregs connected by a matrix composed of a resin and a hardener, to act as a load carrying structure to absorb electromagnetic waves.

Fiber compound materials for load carrying structures have high mechanical strength and rigidity. The strengths and rigidities are essentially determined by the fiber used and by the volumetric fiber proportion.

The matrix most often is an organic resin and connects the individual fibers into a compound material, with high requirements being placed on the matrix both in mechanical and chemical respects.

For instance, in aircraft manufacture fiber compound materials are predominantly used which are laminated from the so-called prepregs (a pre-impregnated fiber structure) and which are cured by the autoclave process.

In order to absorb electromagnetic waves special foils, lacquers or mats are additionally deposited, for instance by bonding, on such structures composed of metal and fiber compound materials. The drawbacks incurred thereby include the additional weight, the greater risk concerning adhesion and service life, for instance fraying of the mat or plate edges, aerodynamic reduction due to surface roughness or joints between the individual abutting mats or plates, and increased maintenance, for instance by testing the coatings for detachment.

For example, German Offenlegungsschrift No. 3,117,245 discloses a method for concealing arbitrary, preferably metallic, objects from radar detection and to protect arbitrary objects from electromagnetic fields, wherein the objects are provided in part or completely on the surface thereof with a metallized pile textile of which that side with the pile is made to face the incident radiation.

In this case also, it is a drawback that the pile material is in the form of an additional layer deposited on the object surface, for instance by bonding, and thereby entails additional weight without assuming a load carrying function. Pile materials are unsuited due to the low strength thereof to sustain stress, for instance rain erosion and their aerodynamic surface grade makes them unfit for deposition on the exterior of aircraft.

Furthermore, the absorption mechanism of pile materials is set for a varying, i.e. for a more or less deep geometry and, in order to achieve adequate absorption, the layer thickness, and hence the weight, becomes excessive.

This being the state of the art, it is the object of the present invention to create a load carrying structural material no longer requiring additional materials and coats deposited on the surface thereof for absorbing the electromagnetic waves, for instance metallized pile materials, mats, lacquers and the like, which now can be eliminated.

The invention offers the advantage that the fillers integrated into the superposed plies of the fibrous compound material absorb the incident electromagnetic waves across the thickness of the fiber compound and in a maximum frequency bandwidth, i.e. they dampen it optimally. The fiber compound jointly with the fillers which are integrated in varying densities across the thickness of the individual plies forms a load carrying structure. In other words, the plies and the fillers admixed into the matrix and insignificantly affecting the strength of the structure, in addition the desired absorption of the electromagnetic waves simultaneously form a fiber compound material of high strength and rigidity without thereby entailing a substantial additional cost in manufacture. This is especially the case for future developments in the design of aircraft, missiles, satellites and ships that will require a high proportion of fiber compound materials.

By integrating such fillers as graphite, pulverized carbon, ferrites, plastic or ceramic powders, or combinations thereof, in a layered fiber compound one further obtains the advantage of the geometry of construction being restricted only to thin plies or being distributed thereacross.

The invention will be further illustrated by reference to the accompanying drawings, in which.

Figure 1:
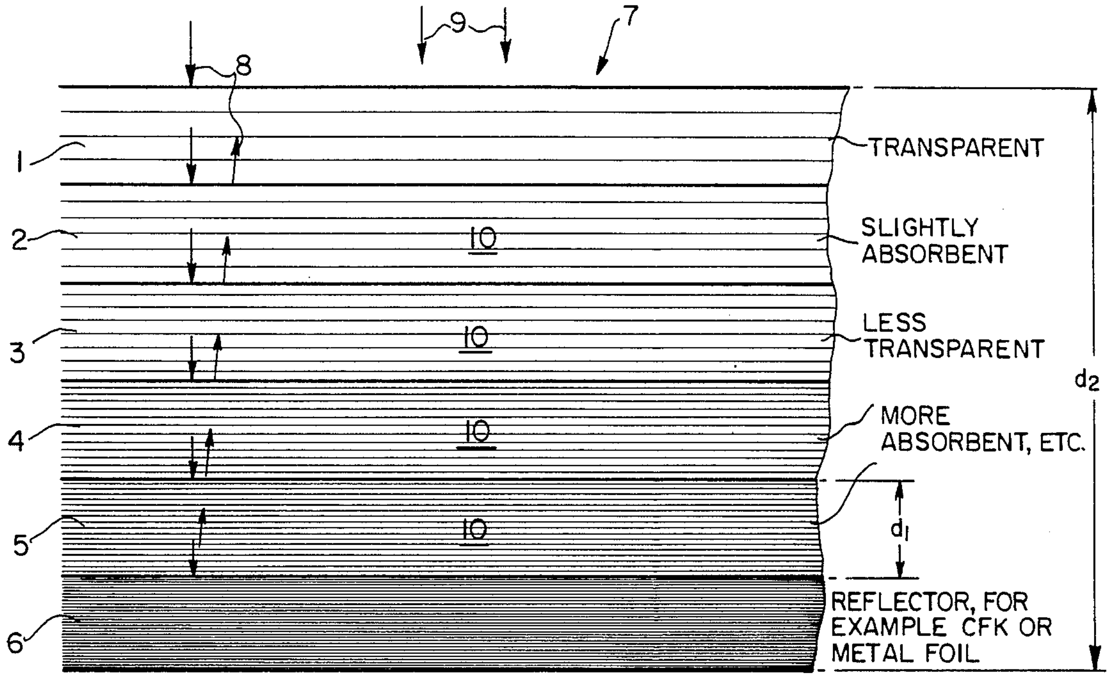
FIG. 1 is a view in section of a layered fiber compound material.

FIG. 1 shows a section of a fiber compound material 7 composed of plies 1, 2, 3, 4, 5, and 6, where the outer ply 1 in contact with the air 9 is transparent with respect to the incident electromagnetic waves 8 and where the inner ply 6 is reflecting with respect thereto—note the directional arrows. The intermediate plies 2, 3, 4, and 5 act as absorption layers because of the fillers 10 incorporated therein, in increasing concentrations inwardly. The fiber compound material 7 together with the individual plies of fiber prepregs 1, 2, 3, 4, 5, and 6, which are each about $d_1$=about 0.25 mm thick forms a structure of a total thickness of $d_2$=about 1.5 mm. The plies 1 and 2 are composed of an Aramid fiber prepreg of 50 percent Aramid fibers and 50 percent epoxy resin. For high performance, a resin with a low dielectric coefficient $\epsilon$ is used. The plies 3, 4, and 5 also are an Aramid prepreg wherein however the impregnating resin used is permeated with the fillers 10, for instance iron or ferrite powder, which absorb the electromagnetic waves 8 and/or with substances increasing the electrical conductivity such as graphite or carbon. The mixing ratios of resin to fillers are optimized with respect to absorption, reflection, frequency bandwidth and the losses in strength that occur from excessive filler proportions. The ply 6 is composed of a carbon fiber prepreg and forms a reflector for those electromagnetic waves 8 still passing through the plies 1, 2, 3, 4, and 5, whereby those waves 8 reaching this ply 6 are forced on their reflected path (see directional arrows) to pass through the plies 5, 4, 3, 2, and 1 acting as absorbers (dampeners) in the opposite direction and hence are absorbed or damped to such an extent that in practice a much attenuated wave exits from ply 1.

Ply 6, acting as a reflector, can be so arranged with respect to ply 1 that in a specific frequency range there will be an extinction effect applied to the electromagnetic waves 8 (interference effect).

The fiber compound 7 can be shaped when depositing the individual plies 1, 2, 3, 4, 5, and 6 by placing them to assume a correponding shape (not shown in detail in the drawings). Again it is possible to place the fiber compound 7 in a mold and to implement shaping or reshaping by rolling against the mold wall. The superposed plies are cured in an autoclave (not shown in further detail in the drawings), for instance at a pressure of about 3.5 bars and at a temperature of about 120° C., similarly to the method conventional in fiber compound aircraft parts manufacture. However, curing also can be performed at room temperature (about 20° C.) when correspondingly selecting the resin-hardener combination.

Obviously, embodiments also are possible in which the individual plies 1, 2, 3, 4, 5, and 6 differ in their thickness $d_1$, and the total thickness $d_2$ of the fiber compound material 7 so created would vary.

Again fillers 10 may be integrated into the transparent ply 1 in contact with the air 9. This also applies to the inner ply 6, which then must no longer operate as a reflector.

Figure 2:
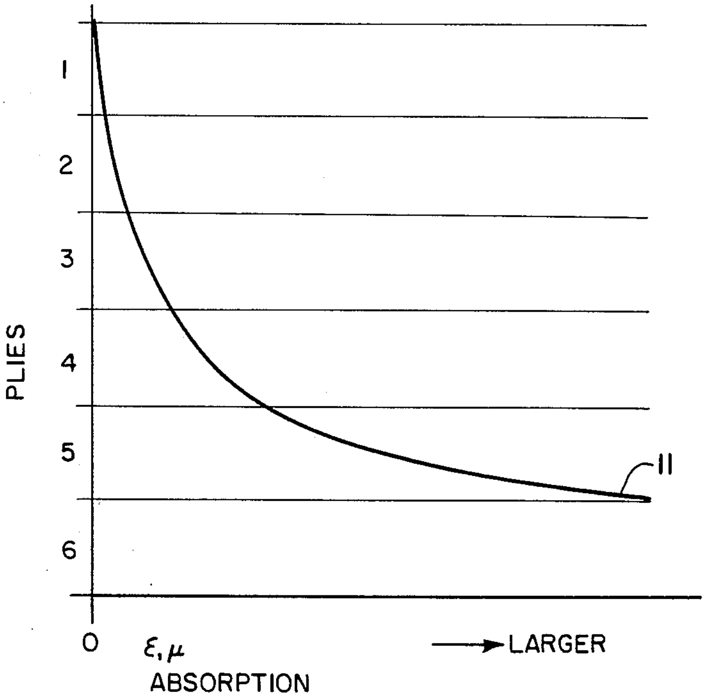
FIG. 2 shows the concentration of the fillers integrated into the individual plies of FIG. 1.

FIG. 2 shows the concentration of the fillers 10 integrated into the individual plies 1, 2, 3, 4, and 5 as a curve 11. The concentration of the fillers increases from ply 1 to ply 5. This means that as the concentration increases, the $\epsilon/\mu$ absorption and damping of the electromagnetic waves 8 also increases. The residue of waves 8 in the ply 5 undergoes reflection at the adjacent ply 6 and passes in the reverse direction through the layers 5, 4, 3, 2, and 1 (see the directional arrows).

It will be obvious to those skilled in the art that many modifications may be made within the scope of the present invention without departing from the spirit thereof, and the invention includes all such modifications.

What we claim is:

1. In a fiber compound material composed of individual layers of superposed directed fiber plies which are joined by a matrix of a resin and a hardener, to act as a load carrying structure to absorb electromagnetic waves, the improvement which comprises the inclusion of at least one radar beam-absorbing filler (10) in the individual plies of the fiber compound material (7) in a concentration varying from the exterior side toward the interior side.

2. A fiber compound material according to claim 1, in which the concentration of the filler (10) in the fiber compound material (7) increases from the exterior side toward the interior side.

3. A fiber compound material according to claim 1, in which the concentration of the filler (10) is higher in the central region of the fiber compound material (7) than at the interior side or exterior side.

4. A fiber compound material according to claim 1, in which the first ply (1) facing the incident electromagnetic waves (8) in the fiber compound material (7) is transparent or only slightly absorbing with respect to the electromagnetic waves (8), one or more of the following plies (2, 3, 4, or 5) is or are absorbing, and a subsequent ply (6) is reflecting or absorbent.

5. A fiber compound material according to claim 1, in which only minor reflection of the electromagnetic waves (8) occurs at the filler (10) and at the ply boundary surfaces of the compound.

6. A fiber compound material according to claim 1, in which at least the first ply (1) facing the electromagnetic waves (8) is transparent with respect thereto and the last ply (6) facing away from the waves (8) may be reflecting.

7. A fiber compound material according to claim 1, in which the first ply (1) is composed of an Aramid fiber of high transmission for the waves (8) or of special fibers, for instance quartz-glass fibers or of e, r, and d type fibers, and in that the last ply (6) is composed for instance of strongly reflecting metallized carbon fibers or of a metal foil.

8. A fiber compound material according to claim 1, in which the filler (10) is composed of several components, for instance graphite, pulverized carbon, ferrite, plastic-ceramic powder, or combinations thereof.

9. A fiber compound material according to claim 1, in which the filler (10) provides absorption for the electromagnetic waves (8) in the frequency range from about 2 to 60 GHz, preferably from 6 to 18 GHz.

10. A fiber compound material according to claim 1, in which the filler (10) can be excited by electrical and/or magnetic fields, for instance in the frequency bands between 2 and 60 GHz and thereby act in an absorbing manner.

11. A fiber compound material according to claim 1, in which the thickness ($d_1$) of the individual plies (1, 2, 3, 4, 5, 6) may vary with respect to each other.

12. A fiber compound material according to claim 1, in which the filler (10) is iron powder or soot.

* * * * *